(12) United States Patent
Okudera et al.

(10) Patent No.: US 11,307,558 B2
(45) Date of Patent: Apr. 19, 2022

(54) MACHINING DEFECT OCCURRENCE PREDICTION SYSTEM FOR MACHINE TOOL

(71) Applicant: FANUC CORPORATION, Yamanashi (JP)

(72) Inventors: Kouya Okudera, Yamanashi (JP); Hiroki Mukai, Yamanashi (JP); Yuuya Miyahara, Yamanashi (JP); Yasushi Okajima, Yamanashi (JP); Shinichi Ogawa, Yamanashi (JP); Noboru Kurokami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 115 days.

(21) Appl. No.: 16/801,095

(22) Filed: Feb. 25, 2020

(65) Prior Publication Data
US 2020/0272125 A1 Aug. 27, 2020

(30) Foreign Application Priority Data
Feb. 27, 2019 (JP) .............................. JP2019-033728

(51) Int. Cl.
*G05B 19/4065* (2006.01)
*G06F 17/18* (2006.01)

(52) U.S. Cl.
CPC ......... *G05B 19/4065* (2013.01); *G06F 17/18* (2013.01); *G05B 2219/50276* (2013.01)

(58) Field of Classification Search
CPC ...... G05B 19/4065; G05B 2219/50276; G06F 17/18
See application file for complete search history.

(56) References Cited

U.S. PATENT DOCUMENTS

| 2018/0341248 | A1* | 11/2018 | Mehr ........................ G06N 3/08 |
| 2020/0125970 | A1* | 4/2020 | Toyama ................. G06Q 50/04 |
| 2020/0242495 | A1* | 7/2020 | Roychowdhury ...... B22F 10/20 |

FOREIGN PATENT DOCUMENTS

| JP | 2010-250384 A | 11/2010 |
| JP | 2015-203646 A | 11/2015 |

(Continued)

OTHER PUBLICATIONS

An Office Action; "Notice of Reasons for Refusal", mailed by the Japanese Patent Office dated May 11, 2021, which corresponds to Japanese Patent Application No. 2019-033728 and is related to U.S. Appl. No. 16/801,095; with English language translation.

(Continued)

*Primary Examiner* — Gary Collins
(74) *Attorney, Agent, or Firm* — Studebaker & Brackett PC

(57) ABSTRACT

Provided is a defect occurrence prediction system for a machine tool that makes it possible to identify the factors causing the occurrence of defects efficiently and effectively, and predict the occurrence of the defects accurately with good precision. A defect occurrence prediction system includes an information data accumulation unit that accumulates various types of information and various types of data relating to a machining operation of the machine tool; a defective product occurrence information data extraction unit that extracts from the information data accumulation unit the various types of information and the various types of data when the defective product is produced in the machined products; and a defect occurrence prediction unit that performs a defect occurrence prediction on a basis of the various types of information and the various types of data extracted by the defective product occurrence information data extraction unit and various types of information and (Continued)

various types of data relating to a machining operation of the machine tool obtained in real time.

4 Claims, 2 Drawing Sheets

(56) References Cited

FOREIGN PATENT DOCUMENTS

| | | |
|---|---|---|
| JP | 2017-068553 A | 4/2017 |
| JP | 2017-170578 A | 9/2017 |
| JP | 2018-073329 A | 5/2018 |
| JP | 2018-138327 A | 9/2018 |
| WO | 2018/225159 A1 | 12/2018 |

OTHER PUBLICATIONS

An Office Action; "Decision of Refusal", mailed by the Japanese Patent Office dated Dec. 14, 2021, which corresponds to Japanese Patent Application No. 2019-033728 and is related to U.S. Appl. No. 16/801,095; with English language translation.

* cited by examiner

MACHINING DEFECT OCCURRENCE PREDICTION SYSTEM FOR MACHINE TOOL

This application is based on and claims the benefit of priority from Japanese Patent Application No. 2019-033728, filed on 27 Feb. 2019, the content of which is incorporated herein by reference.

BACKGROUND OF THE INVENTION

Field of the Invention

The present invention relates to a machining defect occurrence prediction system for a machine tool.

Related Art

Until now, machined products processed by machine tools are subjected to various inspections such as appearance inspection, thread inspection, and three-dimensional measurement inspection, after deburring work and cleaning work are carried out. With such procedures, the defective products are eliminated so that reliable machined products can be shipped as manufactured goods (for example, refer to Patent Document 1).

It has been proposed and implemented to measure, at this time, for example, the tool shape, the tool deflection amount, the spindle load, the machined surface state, the vibration, the cutting sound and the like at the time of machining at arbitrary points and by arbitrary means, monitor the transition of the measurement results, and when a threshold that has been set is exceeded, determine that a defective product has occurred, and identify and handle the factors that the detective product has occurred.

Patent Document 1: Japanese Unexamined Patent Application, Publication No. 2015-203646

SUMMARY OF THE INVENTION

In a case where the measured values of the tool shape, tool deflection amount, spindle load, machined surface state, vibration, the cutting sound or the like at the time of machining change gradually and exceed the threshold, it is possible to handle before becoming a defect; however, in a case where the threshold is unexpectedly exceeded, it is difficult to handle in advance.

Furthermore, it is required to have considerable knowledge and experience to identify the defects or the factors causing the defects, and the number of persons capable of identifying these factors is limited.

In view of the above circumstances, an object of the present invention is to provide a defect occurrence prediction system for a machine tool which efficiently and effectively identifies the factors causing the occurrence of defects, and makes it possible to predict the occurrence of the defects accurately with good precision.

The present inventors have found a means to identify factors causing the occurrence of defects efficiently and effectively and make it possible to predict the occurrence of the defects accurately with good precision, thereby leading to the completion of the present invention.

According to the first aspect of the present invention, a defect occurrence prediction system of a machine tool which predicts an occurrence of a defective product in machined products by the machine tool is provided which includes: an information data accumulation unit that accumulates various types of information and various types of data relating to a machining operation of the machine tool; a defective product occurrence information data extraction unit that extracts from the information data accumulation unit the various types of information and the various types of data when the defective product is produced in the machined products; and a defect occurrence prediction unit that performs a defect occurrence prediction on a basis of the various types of information and the various types of data extracted by the defective product occurrence information data extraction unit and various types of information and various types of data relating to a machining operation of the machine tool obtained in real time, in which the various types of data include measurement data of at least one of vibration and sound during machining of the machine tool, and in which the defect occurrence prediction unit is configured to predict a defect occurrence by performing statistical processing for the measurement data.

According to the second aspect of the present invention, a defect occurrence prediction system of a machine tool which predicts an occurrence of a defective product in machined products by the machine tool is provided which includes: an information data accumulation unit that accumulates various types of information and various types of data relating to a machining operation of the machine tool; a defective product occurrence information data extraction unit that extracts from the information data accumulation unit the various types of information and the various types of data when the defective product is produced in the machined products; and a defect occurrence prediction unit that performs a defect occurrence prediction on a basis of the various types of information and the various types of data extracted by the defective product occurrence information data extraction unit and various types of information and various types of data relating to a machining operation of the machine tool obtained in real time, in which the various types of data include measurement data of at least one of a spindle motor and a servomotor during machining of the machine tool, and in which the defect occurrence prediction unit is configured to predict a defect occurrence by performing statistical processing for the measurement data.

According to the third aspect of the present invention, a defect occurrence prediction system of a machine tool which predicts an occurrence of a defective product in machined products by the machine tool is provided which includes: an information data accumulation unit that accumulates various types of information and various types of data relating to a machining operation of the machine tool; a defective product occurrence information data extraction unit that extracts from the information data accumulation unit the various types of information and the various types of data when the defective product is produced in the machined products; and a defect occurrence prediction unit that performs a defect occurrence prediction on a basis of the various types of information and the various types of data extracted by the defective product occurrence information data extraction unit and various types of information and various types of data relating to a machining operation of the machine tool obtained in real time, in which the various types of data include image data of at least one of a machined part and a tool during machining of the machine tool, and in which the defect occurrence prediction unit is configured to predict a defect occurrence by using at least one of machine learning, threshold determination, and statistical processing on the image data.

According to the fourth aspect of the present invention, a defect occurrence prediction system of a machine tool which predicts an occurrence of a defective product in machined products by the machine tool is provided which includes: an information data accumulation unit that accumulates various types of information and various types of data relating to a machining operation of the machine tool; a defective product occurrence information data extraction unit that extracts from the information data accumulation unit the various types of information and the various types of data when the defective product is produced in the machined products; and a defect occurrence prediction unit that performs a defect occurrence prediction on a basis of the various types of information and the various types of data extracted by the defective product occurrence information data extraction unit and various types of information and various types of data relating to a machining operation of the machine tool obtained in real time, in which the various types of data include measured data detected by an environmental sensor that measures, among air flow, temperature, humidity, pressure, illuminance, and air pollution which are environmental elements in a factory where the machine tool is installed, the environmental elements including at least the air flow, and in which the defect occurrence prediction unit is configured to predict a defect occurrence by using at least one of machine learning, threshold determination, and statistical processing for the measurement data.

According to the present invention, the defect occurrence prediction unit performs machine learning, threshold determination, and statistical processing for various types of measurement data, which makes it possible to identify the factors causing the occurrence of defects efficiently and effectively, and to predict the occurrence of the defects accurately with good precision. With such a configuration, it becomes possible to improve the production yield by suppressing the occurrence of defective products to be less, and provide highly reliable products (machined products).

DETAILED DESCRIPTION OF THE INVENTION

Hereinafter, with reference to FIGS. 1 and 2, a description will be given of a machining defect occurrence prediction system for a machine tool according to an embodiment of the present invention.

Here, the present embodiment relates to a defect occurrence prediction system for a machine tool that makes it possible to identify the factors causing the occurrence of defects efficiently and effectively and predict the occurrence of the defects accurately with good precision in the machining process by the machine tool.

Figure 1:
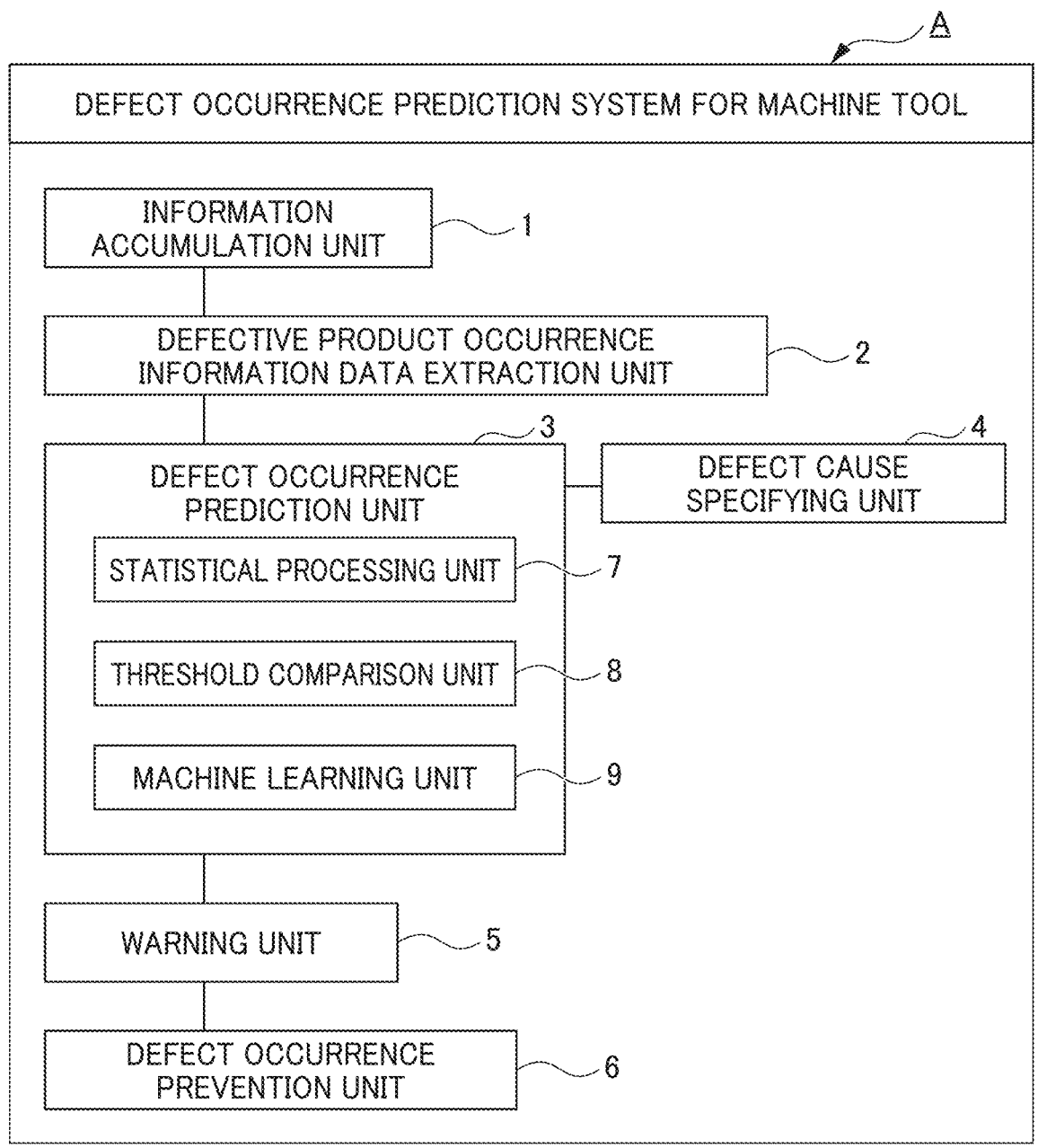
FIG. 1 is a block diagram showing a machining defect occurrence prediction system for a machine tool according to an embodiment of the present invention.
Figure 2:
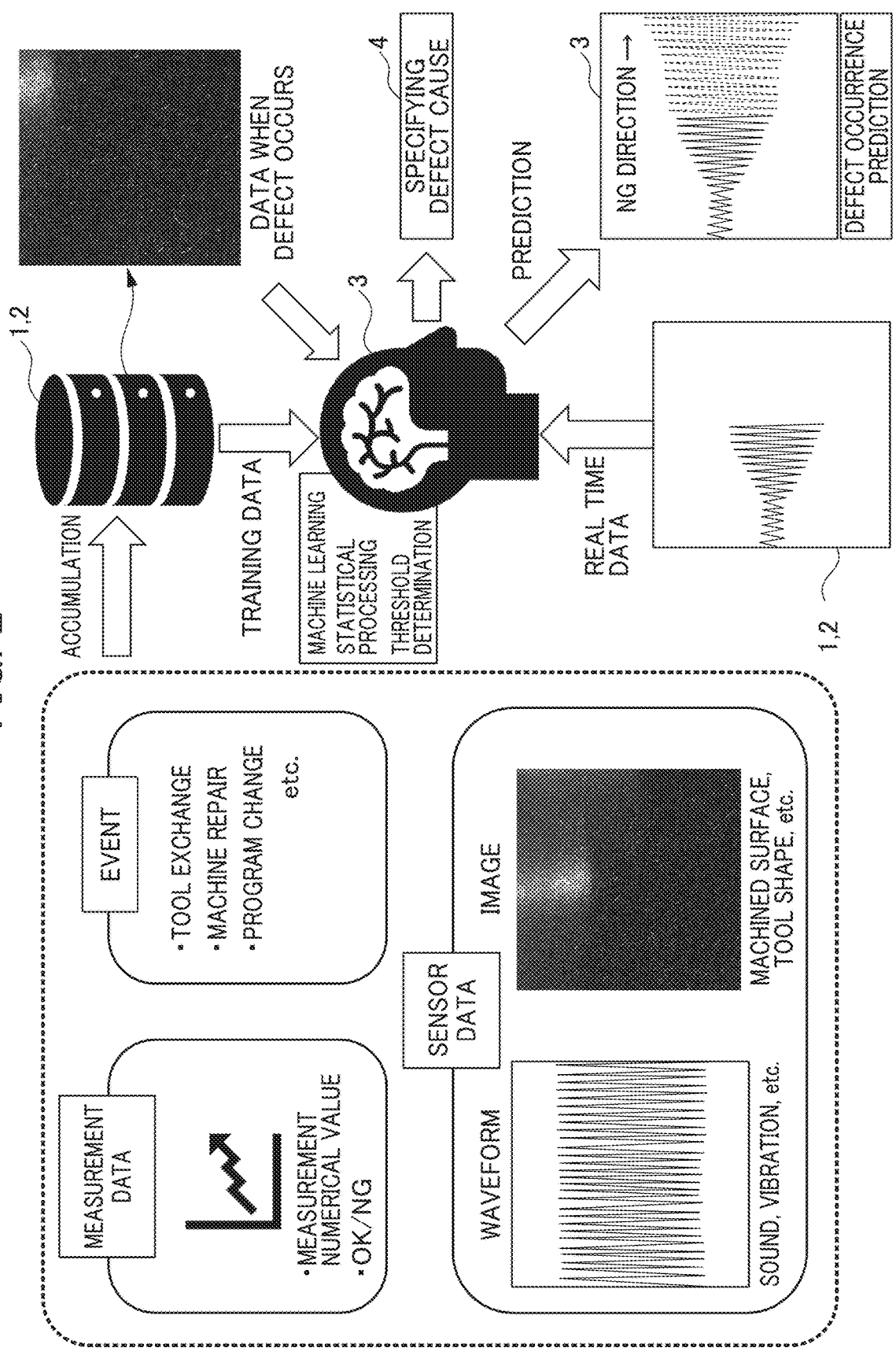
FIG. 2 is a diagram showing a machining defect occurrence prediction system for a machine tool according to an embodiment of the present invention.

More specifically, as shown in FIGS. 1 and 2, a machining defect prediction system A of a machine tool according to the present embodiment includes: an information data accumulation unit 1 that accumulates various types of information and various types of data relating to a machining operation of the machine tool; a defective product occurrence information data extraction unit 2 that extracts from the information data accumulation unit 1 the various types of information and the various types of data when a defective product was produced in machined products; a defect occurrence prediction unit 3 that performs a defect occurrence prediction on the basis of the various types of information and the various types of data extracted by the defective product occurrence information data extraction unit 2 and various types of information and various types of data relating to a machining operation of the machine tool obtained in real time; a defect cause specifying unit 4 that specifies a defect cause on the basis of a processing determination by the defect occurrence prediction unit 3; a warning unit 5 that issues a warning when an occurrence of a defect is predicted by the defect occurrence prediction unit 3; and a defect occurrence prevention unit 6 that interrupts machining or changes machining condition and prevents the occurrence of the defect.

Furthermore, in the defect occurrence prediction system A of the machine tool of the present embodiment, the defect occurrence prediction unit 4 includes: a statistical processing unit 7 that predicts the occurrence of the defect by performing statistical processing for various data; a threshold comparison unit 8 that predicts the occurrence of the defect by performing threshold determination for various data; and a machine learning unit 9 that predicts the occurrence of the defect by performing machine learning by artificial intelligence (AI) on various data.

Here, examples of the various types of information in the present embodiment include information such as the type of the machined product, tool information, tool exchange information, machine repair information, and program change information.

Examples of the various types of data in the present embodiment include: measurement data of at least one of vibration and sound during machining of the machine tool; measurement data of at least one of a spindle motor and a servomotor during machining of the machine tool; image data of at least one of a machined part and a tool during machining of the machine tool; and measurement data detected by an environmental sensor that measures environmental elements including at least air flow among air flow, temperature, humidity, pressure, illuminance, and air pollution which are environmental elements in a factory where the machine tool is installed.

More specifically, as the measurement data of vibration and sound during machining of the machine tool, for example, a vibration sensor (vibration detection unit) is attached to a machine tool mechanism such as a spindle supporting the tool, a telescopic cover, or an ATC shutter. Alternatively, an acoustic sensor (sound detection unit) is provided in the vicinities of them, thereby detecting, obtaining, and storing vibration and sound during machining, or vibration and sound (vibration waveform and acoustic waveform) at the time of the occurrence of abnormality/defect.

As the measurement data of the spindle motor and the servomotor during machining of the machine tool, for example, the electrical current value or the torque during machining is detected, obtained, and stored.

As the image data of at least one of the machined part and the tool during machining by the machine tool, an image such as a machined surface or a tool shape is captured and obtained by an imaging unit such as a CCD camera, and stored.

Examples of the air pollution degree measured by the environmental sensor include the concentration of PM2.5, etc.

Furthermore, in the defect occurrence prediction system A of the machine tool according to the present embodiment, in a case of performing a defect prediction by the threshold determination, the thresholds of various types of measurement data and image processing data are set in advance from the measurement data, the image data, etc., when an abnormality/defect occurred, and the defect occurrence prediction is performed in view of, for example, a situation in which the image processing data have reached the threshold or have not yet reached the threshold. It should be noted that it has been confirmed by the inventors of the present invention that the prediction accuracy is good and suitable when using image data of at least one of the machined part and the tool during machining, the measurement data such as air flow, temperature, humidity, atmospheric pressure, illumination, air pollution, etc., measured by the environmental sensor, as the data for performing the defect prediction by the threshold determination.

In the case of performing the defect prediction by the machine learning, the defect occurrence prediction is performed by monitoring and analyzing as necessary the measurement data obtained by AI in real time on the basis of the measurement data when an abnormality/defect occurred and/or the measurement data obtained in the past. It should be noted that it has been confirmed by the inventors of the present invention that the prediction accuracy is improved and thus preferable by using image data of at least one of the machined part and the tool during machining, the measurement data such as air flow, temperature, humidity, atmospheric pressure, illumination, air pollution, etc., measured by the environmental sensor, as the data for performing the defect prediction by the machine learning.

In a case of performing the defect prediction by statistical processing, the statistical processing is performed on the basis of the measurement data when an abnormality/defect occurred and/or the measurement data obtained in the past, and the defect occurrence prediction is performed by comparing and analyzing the statistical processing data and the measurement data obtained in real time. It should be noted that it has been confirmed by the inventors of the present invention that the prediction accuracy is good and suitable when using the measurement data of vibration and sound during machining, the measurement data of a spindle motor or a servo motor during machining, image data of at least one of the machined part and the tool during machining, the measurement data such as air flow, temperature, humidity, atmospheric pressure, illumination, air pollution, etc., measured by the environmental sensor, as the data for performing the defect prediction by the machine learning.

As a specific example of the statistical processing, the measurement data of vibration and sound during machining, the measurement data of a spindle motor or a servomotor during machining, image data of at least one of the machined part and the tool during machining, the measurement data such as air flow, temperature, humidity, atmospheric pressure, illumination, air pollution, etc., measured by the environmental sensor are measured, the time-dependent waveform data of the measurement data during machining is acquired, the average, maximum, minimum, variance (standard deviation), kurtosis, skewness, etc., are obtained, to perform the defect prediction. For example, the variance and kurtosis of a torque command value to the spindle motor fluctuate (rising in variance, and falling in kurtosis) by the lapse of tool use time (advancing of tool wear). The defect prediction is performed from such relationships.

Therefore, according to the defect occurrence prediction system A of the machine tool of the present embodiment, the defect occurrence prediction unit 3 performs the machine learning, the threshold determination, and the statistical processing for the various types of measurement data, which makes it possible to efficiently and effectively identify the factors causing the occurrence of defects, and thus makes it possible to predict the occurrence of the defects accurately with good precision. With such a configuration, it becomes possible to improve the production yield by suppressing the occurrence of defective products less, and provide highly reliable products (machined products).

An embodiment of the defect occurrence prediction system for the machine tool according to the present invention has been described as above. However, the present invention is not limited to one embodiment described above, and it is appropriately changeable to the extent that does not deviate from the spirit.

EXPLANATION OF REFERENCE NUMERALS 1 information data accumulation unit
2 defective product occurrence information data extraction unit
3 defect occurrence prediction unit
4 defect cause specifying unit
5 warning unit
6 defect occurrence prevention unit
7 statistical processing unit
8 threshold comparison unit
9 machine learning unit
A defect occurrence prediction system for machine tool

What is claimed is:

1. A defect occurrence prediction system of a machine tool which predicts an occurrence of a defective product in machined products by the machine tool, the defect occurrence prediction system comprising a processor, the processor being configured to:
    accumulate various types of information and various types of data from at least one first sensor of a plurality of sensors relating to a machining operation of the machine tool;
    extract the various types of information and the various types of data when the defective product is produced in the machined products; and
    perform a defect occurrence prediction on a basis of the extracted various types of information and the extracted various types of data and various types of information and various types of data relating to a machining operation of the machine tool obtained in real time,
    wherein the various types of data include measurement data of at least one of vibration and sound during machining of the machine tool obtained from at least one second sensor of the plurality of sensors,
    wherein the processor is configured to perform statistical processing for the measurement data and to predict a defect occurrence by comparing data obtained by the statistical processing and the measurement data obtained in real time, and
    wherein the processor issues a warning when the processor predicts a defect occurrence.

2. A defect occurrence prediction system of a machine tool which predicts an occurrence of a defective product in machined products by the machine tool, the defect occurrence prediction system comprising a processor, the processor being configured to:
    accumulate various types of information and various types of data from at least one first sensor of a plurality of sensors relating to a machining operation of the machine tool;

extract the various types of information and the various types of data when the defective product is produced in the machined products; and perform a defect occurrence prediction on a basis of the extracted various types of information and the extracted various types of data and various types of information and various types of data relating to a machining operation of the machine tool obtained in real time, wherein the various types of data include measurement data of at least one of a spindle motor and a servomotor during machining of the machine tool obtained from at least one second sensor of the plurality of sensors, wherein the processor is configured to perform statistical processing for the measurement data and to predict a defect occurrence by comparing data obtained by the statistical processing and the measurement data obtained in real time, and wherein the processor issues a warning when the processor predicts a defect occurrence.

3. A defect occurrence prediction system of a machine tool which predicts an occurrence of a defective product in machined products by the machine tool, the defect occurrence prediction system comprising a processor, the processor being configured to:

accumulate various types of information and various types of data from at least one first sensor of a plurality of sensors relating to a machining operation of the machine tool;

extract the various types of information and the various types of data when the defective product is produced in the machined products; and perform a defect occurrence prediction on a basis of the extracted various types of information and the extracted various types of data and various types of information and various types of data relating to a machining operation of the machine tool obtained in real time, wherein the various types of data include image data of at least one of a machined part and a tool during machining of the machine tool obtained from at least one second sensor of the plurality of sensors, wherein the processor is configured to predict a defect occurrence by using at least threshold determination on the image data, and wherein the processor issues a warning when the processor predicts a defect occurrence.

4. A defect occurrence prediction system of a machine tool which predicts an occurrence of a defective product in machined products by the machine tool, the defect occurrence prediction system comprising:

an information data accumulation unit that accumulates various types of information and various types of data relating to a machining operation of the machine tool;

a defective product occurrence information data extraction unit that extracts from the information data accumulation unit the various types of information and the various types of data when the defective product is produced in the machined products; and a defect occurrence prediction unit that performs a defect occurrence prediction on a basis of the various types of information and the various types of data extracted by the defective product occurrence information data extraction unit and various types of information and various types of data relating to a machining operation of the machine tool obtained in real time, wherein the various types of data include measured data detected by an environmental sensor that measures, among air flow, temperature, humidity, pressure, illuminance, and air pollution which are environmental elements in a factory where the machine tool is installed, the environmental elements including at least the air flow, and wherein the defect occurrence prediction unit is configured to predict a defect occurrence by using at least one of machine learning, threshold determination, and statistical processing for the measurement data.

* * * * *